(12) United States Patent
Fujino

(10) Patent No.: US 8,965,760 B2
(45) Date of Patent: Feb. 24, 2015

(54) COMMUNICATION DEVICE, METHOD, NON-TRANSITORY COMPUTER READABLE MEDIUM, AND SYSTEM OF A REMOTE CONFERENCE

(71) Applicant: Hiroaki Fujino, Nagoya (JP)

(72) Inventor: Hiroaki Fujino, Nagoya (JP)

(73) Assignee: Brother Kogyo Kabushiki Kaisha, Nagoya-shi (JP)

( * ) Notice: Subject to any disclaimer, the term of this patent is extended or adjusted under 35 U.S.C. 154(b) by 78 days.

(21) Appl. No.: 13/781,033

(22) Filed: Feb. 28, 2013

(65) Prior Publication Data

US 2013/0176382 A1 Jul. 11, 2013

Related U.S. Application Data

(63) Continuation-in-part of application No. PCT/JP2011/071839, filed on Sep. 26, 2011.

(30) Foreign Application Priority Data

Sep. 28, 2010 (JP) ................................ 2010-217505

(51) Int. Cl.
*G10L 15/00* (2013.01)
*H04N 7/15* (2006.01)
*H04L 12/18* (2006.01)
*H04M 3/56* (2006.01)

(52) U.S. Cl.
CPC .............. *H04N 7/15* (2013.01); *H04L 12/1827* (2013.01); *H04M 3/567* (2013.01); *H04L 12/1822* (2013.01)

USPC .......................................... 704/235; 704/231

(58) Field of Classification Search
USPC .................................................. 704/230–257
See application file for complete search history.

(56) References Cited

U.S. PATENT DOCUMENTS

| | | | |
|---|---|---|---|
| 5,949,886 A * | 9/1999 | Nevins et al. .................... 381/57 |
| 2005/0097439 A1* | 5/2005 | Ikeda et al. ................ 715/500.1 |
| 2010/0250249 A1* | 9/2010 | Fujino ............................ 704/235 |
| 2011/0069843 A1* | 3/2011 | Cohen et al. .................... 381/56 |

FOREIGN PATENT DOCUMENTS

| | | | |
|---|---|---|---|
| JP | 2002344915 A | 11/2002 |
| JP | 2004289356 A | 10/2004 |

(Continued)

OTHER PUBLICATIONS

Search Report for PCT/JP2011/071839 dated Dec. 20, 2011.

(Continued)

*Primary Examiner* — Mohammad Islam
(74) *Attorney, Agent, or Firm* — Banner & Witcoff, Ltd.

(57) ABSTRACT

A communication device may acquire material data to share with a particular communication device, when one or more of first image data and first audio data is outputted. The communication device may determine whether the acquired material data includes audio data. Additionally, the communication device may change a first sound volume setting to a second sound volume setting, in response to determining that the acquired material data includes audio data. The communication device may output, through an audio output device, received first audio data according to the second sound volume setting and the material data according to a third sound volume setting.

20 Claims, 11 Drawing Sheets

(56) References Cited

FOREIGN PATENT DOCUMENTS

| | | |
|---|---|---|
| JP | 2005064592 A | 3/2005 |
| JP | 2006186867 A | 7/2006 |

OTHER PUBLICATIONS

Notice of Reasons for Rejection for corresponding Japanese Patent Application No. 2010-217505 mailed Dec. 17, 2013.

* cited by examiner

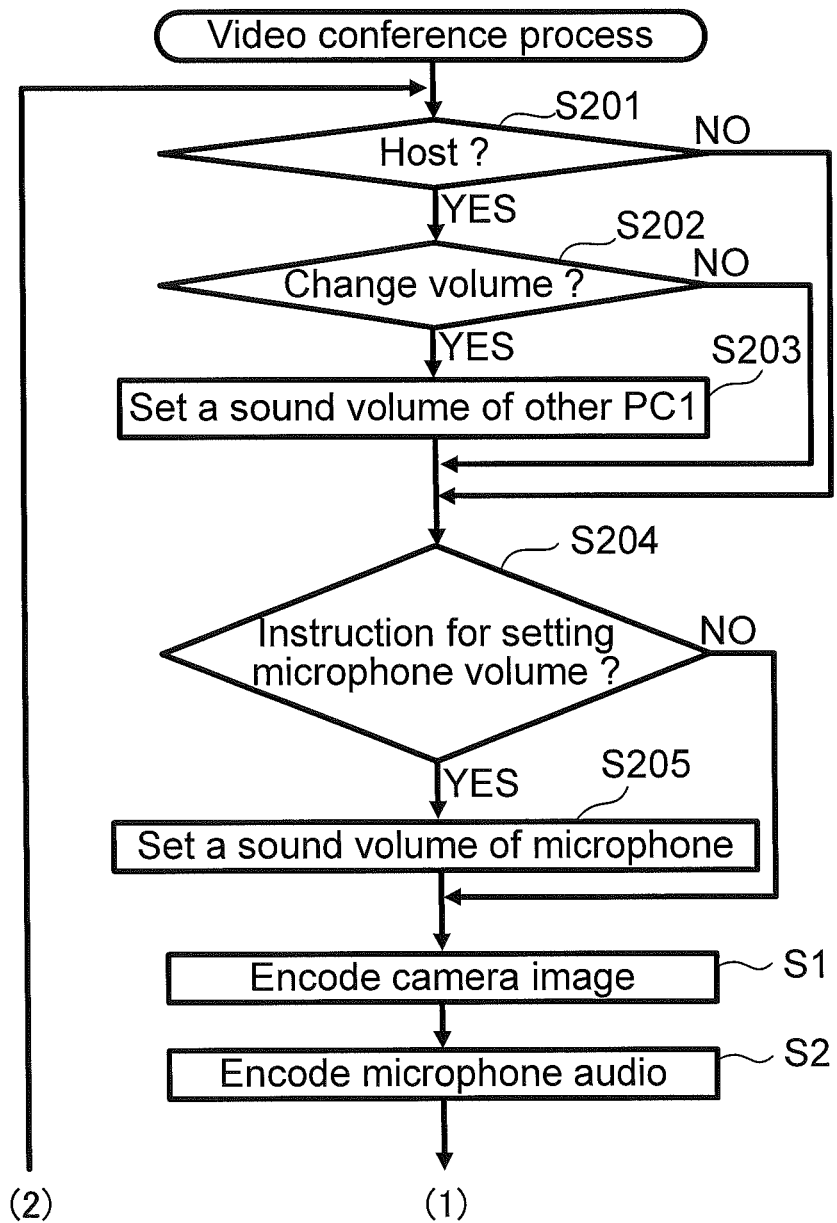

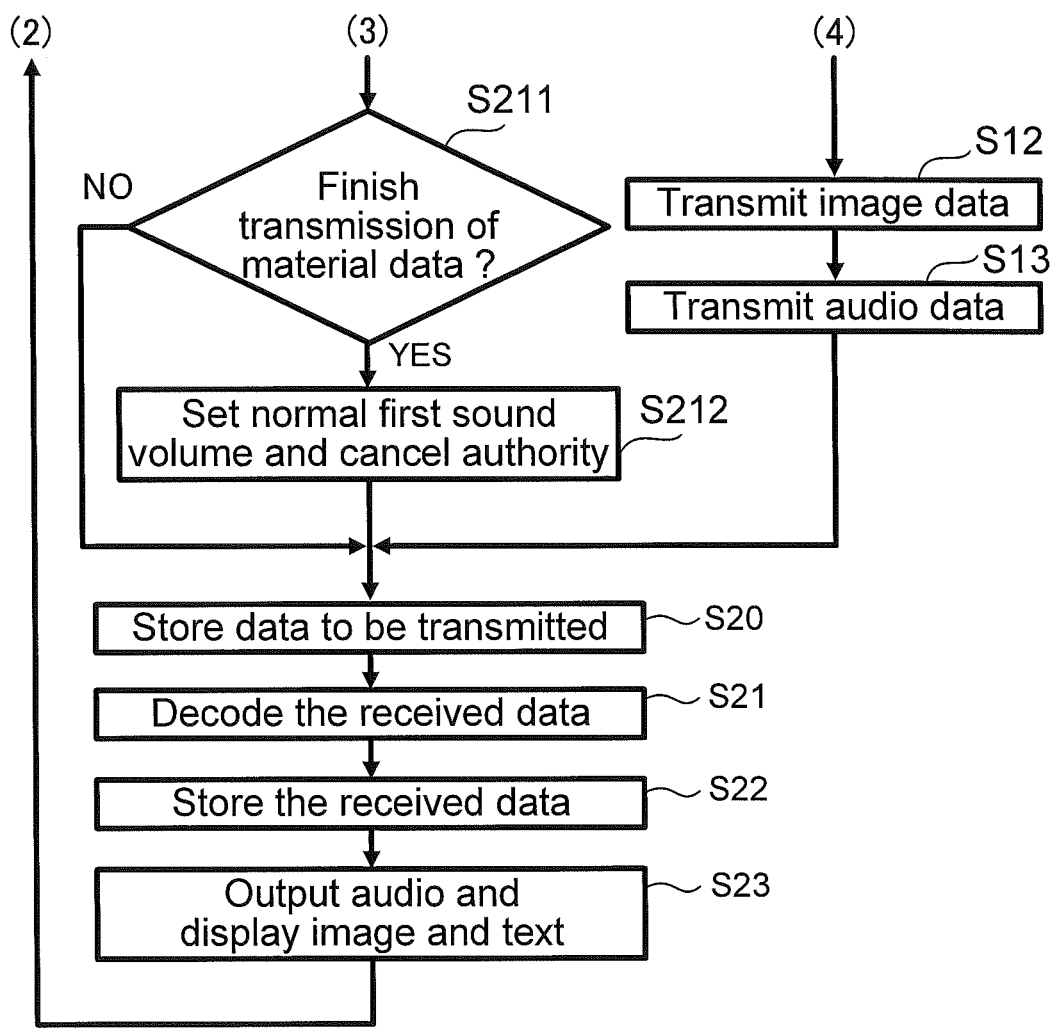

COMMUNICATION DEVICE, METHOD, NON-TRANSITORY COMPUTER READABLE MEDIUM, AND SYSTEM OF A REMOTE CONFERENCE

CROSS-REFERENCE TO RELATED APPLICATION

This application is a continuation-in-part of International Patent Application No. PCT/JP2011/071839, filed on Sep. 26, 2011, which claims the benefit of Japanese Patent Application No. 2010-217505, filed on Sep. 28, 2010, the disclosures of which are incorporated herein by reference.

TECHNICAL FIELD

Aspects of the disclosure relate to a communication device, method, non-transitory computer readable medium, and system that are configured to execute a remote conference held among a plurality of communication devices via a network.

BACKGROUND

Techniques for holding a remote conference among a plurality of communication devices have been proposed. For example, in a conventional communication system, a character conversion device executes a process of audio or voice recognition to convert utterances during the remote conference into character information. The character conversion device causes a display to display the character information with utterance history information. The utterance history information represents an amount of utterance or activeness of utterance, such as a word count.

SUMMARY

If material data is shared among a plurality of communication devices in the remote conference, users of the remote conference using the plurality of communication devices can understand content of the shared material data at the same time and the remote conference can be performed smoothly.

If the material data is related to audio data or the material data includes audio data, each of the plurality of communication devices in the remote conference outputs the material data and audio data inputted from other communication devices in the remote conference through a speaker of the communication device at the same time.

Accordingly, it may be difficult for a user of the communication device to determine whether the audio data outputted by the speaker is related to the material data or is the audio data inputted from another communication device.

Aspects of the disclosure provide for a communication device, a method, a non-transitory computer readable medium, and system that are configured to assist users of a remote conference to understand audio data of material data shared with a plurality of communication devices in the remote conference.

Other objects, features, and advantages will be apparent to persons of ordinary skill in the art from the following detailed description of the disclosure and the accompanying drawings.

BRIEF DESCRIPTION OF THE DRAWINGS

For a more complete understanding of the present disclosure, needs satisfied thereby, and the objects, features, and advantages thereof, reference now is made to the following descriptions taken in connection with the accompanying drawing.

FIG. 8A is a flowchart depicting a video conferencing process of the PC 1 in a third illustrative embodiment according to one or more aspects of the disclosure.

FIG. 8C is a flowchart depicting a video conferencing process of the PC 1 in a third illustrative embodiment according to one or more aspects of the disclosure.

DETAILED DESCRIPTION OF EXAMPLE EMBODIMENTS

Figure 1:
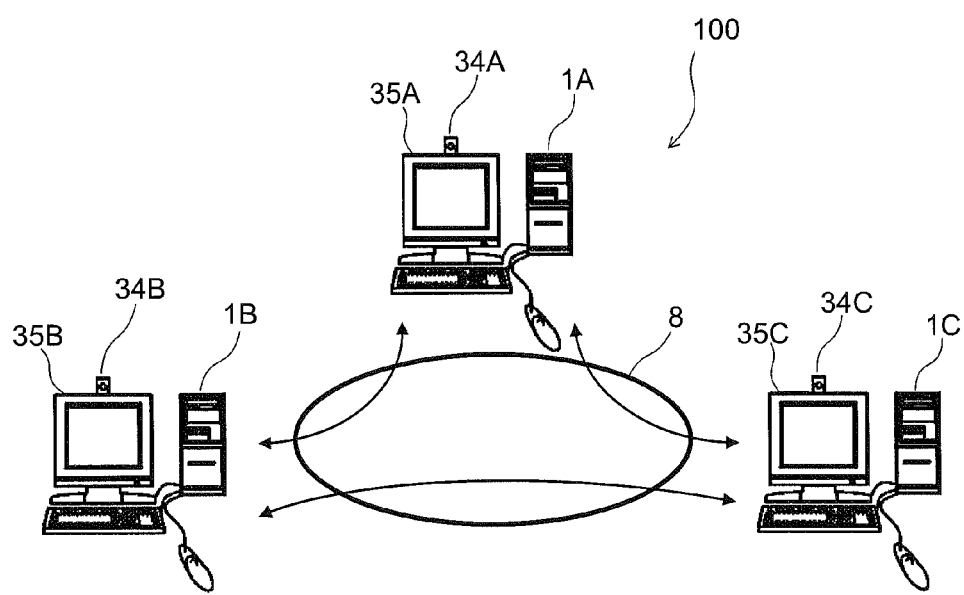
FIG. 1 depicts a configuration of a communication system 100 in a first illustrative embodiment according to one or more aspects of the disclosure.

Hereinafter, a first illustrative embodiment will be described in detail with reference to the accompanying drawings. The drawings will be referred to in order to explain technical features that may be adopted by the aspects of the disclosure. Configurations of devices and flowcharts of various processes depicted in the drawings do not limit the aspects of the disclosure but merely illustrate the aspects of the disclosure.

With reference to FIG. 1, a configuration of a communication system 100 will be described. The communication system 100 comprises a plurality of computing devices 1 (e.g., a personal computer (PC), laptop computer, etc.). The computing device 1, may also be referred to as, for example, a communication device. For example, with reference to FIG. 1, the plurality of computing devices 1 may include computing device 1A, computing device 1B, and computing device 1C. The computing device 1A may be provided at a location A, the computing device 1B may be provided at a location B, and the computing device 1C may be provided at a location C. For example, each of the plurality of computing devices 1 may be configured to transmit and receive various data and instructions to and from other computing devices 1 via a network 8, such as a wide area network (WAN) (for example, the Internet). In detail, each of the plurality of computing devices 1 is configured to execute peer to peer communication (P2P) among the plurality of the computing devices 1. Further, each of the plurality of the computing devices 1 is configured to transmit and receive various data, such as image data, audio data, or text data to and from other computing devices 1 among the plurality of the computing devices 1. A communication device in this disclosure is not limited to a personal computer, laptop, etc. Rather, the communication device may be, for example, a specialized video conference device configured to execute a video conference (e.g., a television (TV) conference). The specialized video conference device may be provided at a particular location. The plurality of the computing devices 1 may transmit and receive data, such as image data, audio data, or text data among the plurality of the computing devices 1 via a server.

Figure 3:
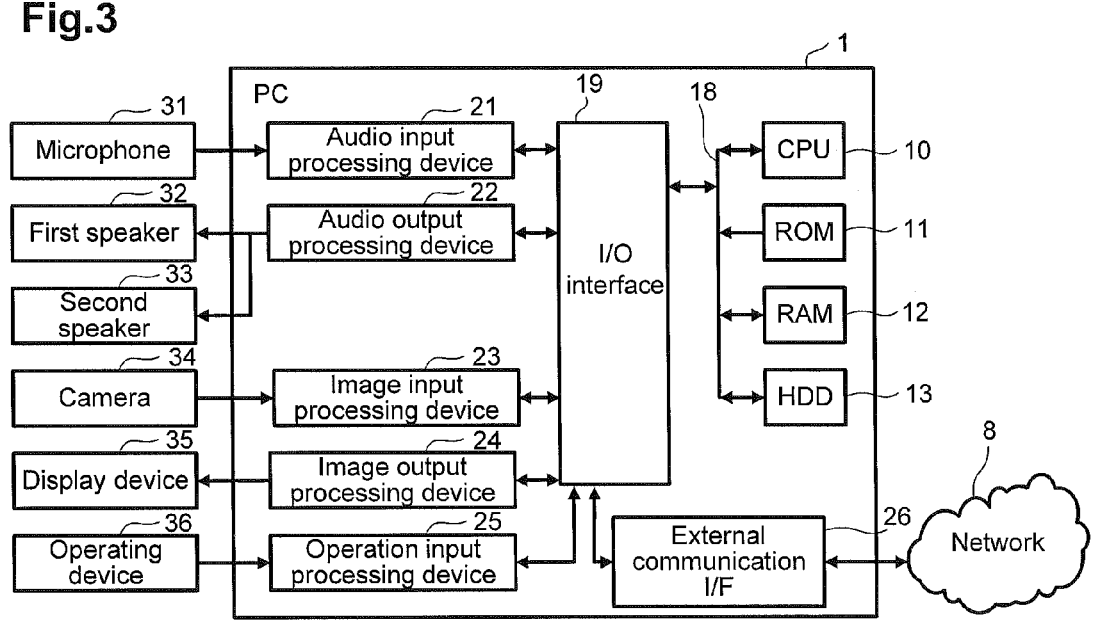
FIG. 3 is a block diagram depicting an electrical configuration of a PC 1 in the first illustrative embodiment according to one or more aspects of the disclosure.

The communication system 100 may be a video conference system for executing a remote conference using image and/or audio. As depicted in FIG. 1, a camera 34A, camera 34B, and camera 34C may be configured to be connected to the computing device 1A, the computing device 1B, and the computing device 1C, respectively. As depicted in FIG. 1, a display 35A, display 35B, and display 35C may also be configured to be connected to the computing device 1A, the computing device 1B, and the computing device 1C, respectively. As depicted in FIG. 3 described below, a microphone 31 may also be configured to be connected to each of the computing device 1A, the computing device 1B and the computing device 1C. Camera image data acquired by the camera 34A of computing device 1A and microphone audio data inputted by the microphone 31 of computing device 1A may be transmitted from the computing device 1A to the computing device 1B and the computing device 1C. When the computing device 1A receives camera image data acquired by the camera 34B and camera image data acquired by the camera 34C from the computing device 1B and the computing device 1C, the computing device 1A may cause the display 35A to display camera image data acquired by the camera 34B and camera image data acquired by the camera 34C. Furthermore, when the computing device 1A receives microphone audio data inputted by the microphone 31 of the computing device 1B and microphone audio data inputted by the microphone 31 of the computing device 1C, the computing device 1A may cause a first speaker 32 and a second speaker 33 in FIG. 3 to output audio based on the microphone audio data inputted by the microphone 31 of the computing device 1B and the microphone audio data inputted by the microphone 31 of the computing device 1C. As a result of above-mentioned process, image and audio acquired by each of the computing device 1A, the computing device 1B, and the computing device 1C are shared among the plurality of the computing device 1 in the communication system 100. A remote conference (e.g., the television ("TV") conference) can be executed by the computing device 1A, the computing device 1B, and the computing device 1C in the communication system 100. One or more computing devices 1 may participate in a remote conference.

Furthermore, in addition to camera image data acquired by the camera 34 and microphone audio data inputted via the microphone 31, material data can be shared among the plurality of computing devices 1 in the communication system 100. The material data may be moving image data, static image data, document data, drawing data, audio data, and/or the like. "Material audio data" represents audio of the material data. In some cases, the material data may be configured to include only material audio data. Meanwhile, in some cases, the material data may be configured by one or more of material audio data and material image data. "Material image data" represents one or more moving images or static images of the material data.

At first, an instruction for transmitting material data from the computing device 1A to the computing device 1B and the computing device 1C is inputted in the computing device 1A. When the computing device 1A receives the instruction for transmitting material data from the computing device 1A to the computing device 1B and the computing device 1C, the computing device 1A generates material data. For example, the computing device 1A may generate material data by capturing an image displayed by the display device 35A and executing a process of encoding the captured image. When the computing device 1A shares audio with the computing device 1B and the computing device 1C, the computing device 1A generates material data by encoding audio acquired by the microphone 31 of the computing device 1A. Hereinafter, the computing device 1A, which receives an instruction for transmitting the material data, is referred to as a "delivery source device". Hereinafter, the computing device 1B or the computing device 1C, which receive the material data, are each referred to as a "delivery destination device". The delivery source device may transmit the generated material data to the delivery destination devices in communication system 100. The delivery destination devices may output the material data by executing a process of decoding the received material data. Accordingly, the computing device 1A, the computing device 1B, and the computing device 1C can share material data with one another in the video conference.

The material data may be stored in a memory of the delivery source device in advance. When the delivery source device and the delivery destination device execute a video conference, the material data may be acquired from a particular device via a network 8 by the delivery source device.

Figure 2:
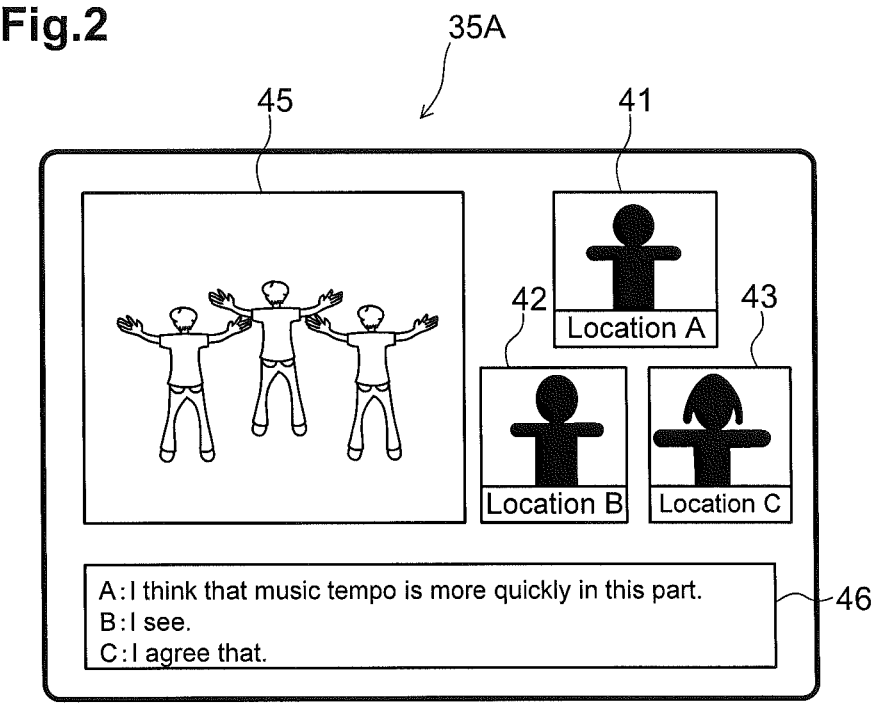
FIG. 2 illustrates an example image displayed on a display device 35 of computing device 1 in the first illustrative embodiment according to one or more aspects of the disclosure.

With reference to FIG. 2, an example image displayed by the display device 35A in sharing material data in the communication system 100 will be described. FIG. 2 represents an example image displayed by the display device 35A of the computing device 1A in the video conference among the computing device 1A, the computing device 1B, and the computing device 1C. Multiple display areas may be generated within a display screen of the display device 35A. For example, as shown in FIG. 2, a first display area 41, second display area 42, and third display area 43 may be generated on the display device 35A. The first display area 41 may be configured to display an image based on the camera image data acquired by the camera 34A of the computing device 1A. The second display area 42 may be configured to display an image according to the camera image data which is received from the computing device 1B. The third display area 43 may be configured to display an image according to the camera image data which is received from the computing device 1C. Furthermore, as described-above, the computing device 1A can output audio according to microphone audio data which is received from the computing device 1B and the computing device 1C. Accordingly, a participant in the video conference using the computing device 1A can execute a video conference using an image displayed in the display device 35A and audio outputted by the computing device 1A.

A material data display area 45 is generated in a display screen of the display device 35A. An image based on the material data shared among the computing device 1A, the computing device 1B and the computing device 1C is displayed in the material data display area 45. For example, when the computing device 1A functions as the delivery source device to transmit the material data to the computing device 1B and the computing device 1C, the computing device 1A generates the material data by capturing an image displayed in the material data display area 45 and transmits the generated material data to the computing device 1B and the computing device 1C. In another example, when the computing device 1A functions as the delivery destination device and receives the material data, the computing device 1A displays an image in the material data display area 45 based on the material data which is received from the delivery source device. As described-above, the computing device 1A can output audio when material audio data is included in the material data.

A text display area 46 is also generated in a display screen of display device 35A. A text which represents audio based on the material audio data may be displayed in the text display area 46, when the material audio data is included in the material data. A text which represents utterances (e.g., speech) inputted by each microphone 31 configured to be connected to each of the computing device 1A, computing device 1B, and computing device 1C may be displayed in the text display area 46 as well.

In the first illustrative embodiment, the computing device 1A, computing device 1B, and computing device 1C in the video conference can share material audio data. The computing device 1A may output audio based on the material audio data and the microphone audio data which is received from the computing device 1B and computing device 1C, when the material audio data is shared among the computing device 1A, computing device 1B and computing device 1C. In this case, a user of the video conference using the computing device 1A may receive both audio which is outputted according to the material audio data and audio which is outputted according to the microphone audio data at the same time. However, if audio which is outputted according to the material audio data and audio which is outputted according to the microphone audio data are outputted at approximately the same sound volume, it may be difficult for the user to distinguish which audio is outputted according to the material audio data and which audio is outputted according to the microphone audio data. In the first illustrative embodiment, the computing device 1A may help the user to distinguish audio which is outputted according to the material audio data and audio which is outputted according to the microphone audio data by adjusting sound volume of certain audio. The computing device 1A may adjust the sound volume of audio which is outputted according to the material audio data and/or audio which is outputted according to the microphone audio data. Furthermore, the computing device 1A may help the user to distinguish each of audio which is outputted according to the material audio data and audio which is outputted according to the microphone audio data by executing a process of generating a text which represents content of utterances (e.g., speech) made during the video conference based on the microphone audio data.

In the first example embodiment, a program for executing the TV conference may be installed in the computing device 1. The installed program may be executed on top of an operating system (OS) of the computing device 1. The video conference may be executed among the computing device 1A, computing device 1B, and computing device 1C by activating a program on each of the computing device 1A, computing device 1B, and computing device 1C. With reference to FIG. 3, an electrical configuration of each computing device 1 will be described. A plurality of the computing devices 1 may have similar configurations. Therefore, the following description will be made with reference to just one of the computing devices 1. In the first illustrative embodiment, the computing device 1 may be a general-purpose personal computer (PC). The computing device 1 may comprise a central processing unit ("CPU") 10, a read-only memory ("ROM") 11, a random-access memory ("RAM") 12, a hard disk drive ("HDD") 13, and an input/output ("I/O") interface 19. The CPU 10, the ROM 11, the RAM 12, the HDD 13, and the I/O interface 19 are connected with each other via a bus 18. The CPU 10 is configured to control the computing device 1.

The ROM 11 is configured to store various programs, for example, a basic input output system ("BIOS"), for operating the computing device 1, and various initial setting values. The RAM 12 is configured to temporarily store various information to be used by a program, such as a program for establishing a video conference.

The HDD 13 may be a nonvolatile storage device and may be configured to store a program for allowing the CPU 10 to perform the remote conference. The program may be stored in the HDD 13 via a recording medium, for example, a compact-disc read-only memory ("CD-ROM"). In some instances, the program may be stored in a predetermined server. In this case, the program may be downloaded from the predetermined server and stored in the HDD 13 via the network 8. The HDD 13 may be configured to store an Operating System (OS) which controls the computing device 1. The OS may be configured to control the microphone 31 of the computing device 1 and the first speaker 32 and the second speaker 33 of the computing device 1.

The HDD 13 may also be configured to store an acoustic model for determining words based on sound characteristics, language model for determining words based on context (or sequence of words), and dictionary of words. The computing device 1 may be configured to execute an audio or voice recognition process using the stored acoustic model, language model, and dictionary. The CPU 10 may analyze the microphone audio data and extract a feature quantity (e.g., FFT coefficients, DCT coefficients, etc.), when the material audio data is shared. After extracting a feature quantity, the CPU 10 may match the extracted feature quantity to one or more of the stored acoustic model and the language model. As a result of matching, a likelihood of similarity measurement may be calculated for each word, phrase, and/or sentence by the CPU 10. Then, the CPU 10 may determine which sentence has the highest likelihood of similarity measurement from among a plurality of calculated likelihood of similarity measurements as a recognition result of the audio or voice recognition. In the matching process, when the CPU 10 determines a match for an extracted feature quantity, the CPU 10 uses the stored language model, which may be configured to refer to the dictionary of words. When the CPU 10 determines that the likelihood of similarity is equal to or lower than a predetermined value, the CPU 10 may determine that the audio or voice recognition was unsuccessful or has failed. As a result, the CPU 10 might not receive a recognition result of the audio or voice recognition. The computing device 1 may enable a user of the computing device 1 to understand content of audio inputted through the microphone 31 by generating text based on the recognition result of the audio or voice recognition and displaying the generated text on the display device 35. Further details of generating text and displaying the generated text in the display device 35 will be described below. Instead of the HDD 13, a storage device, for example, an Electrically Erasable Programmable Read Only Memory (EEPROM), a memory card, or any other computer-readable storage medium may be applied to the computing device 1. Herein, a computer-readable storage medium may be a non-transitory computer-readable storage medium, which excludes a transitory signal, but which may include any other storage medium regardless of a time period that the storage medium stores data.

With reference to FIG. 3, an audio input processing device 21, an audio output processing device 22, an image input processing device 23, an image output processing device 24, an operation input processing device 25, and an external communication interface ("I/F") 26 may be connected to the I/O interface 19. The microphone 31 may be configured to be connected to the audio input processing device 21. The audio input processing device 21 may be configured to process audio data inputted from the microphone 31 that acquires audio. The first speaker 32 and the second speaker 33 may be configured to be connected to the audio output processing device 22. The audio output processing device 22 may be configured to process operations of the first speaker 32 and the second speaker 33. The camera 34 may be configured to be connected to the image input processing device 23. The image input processing device 23 may be configured to process image data inputted from the camera 34 that captures an image. The display device 35 may be configured to be connected to the image output processing device 24. The image output processing device 24 may be configured to control how images are displayed on the display device 35 that displays an image. The operation input processing device 25 may be configured to process operations inputted from an operating device 36, for example, a keyboard or a mouse. The external communication I/F 26 may be configured to allow the communication device 1 to connect to the network 8. The audio input processing device 21, the audio output processing device 22, the image input processing device 23, the image output processing device 24, and the operation input processing device may be controlled by the operating system (OS) installed in the computing device 1.

With reference to FIG. 4, a video conference process performed by the computing device 1 in the first illustrative embodiment will be described. For example, the video conference process in FIG. 4 may be carried out by the CPU 10 according to a program stored in the HDD 13, when a switch of the computing device 1 is turned on and the computing device 1 receives an instruction for executing the video conference. When the computing device 1A executes the video conference, the instruction for executing the video conference may include an identifier (e.g., user name, computing device name, etc.) of the computing device 1B and an identifier of the computing device 1C, which execute the video conference with the computing device 1A. In the first example embodiment, the computing device 1 may perform functions of both the delivery source device and the delivery destination device. When the material data is selected by a user of the computing device 1 and an instruction to start transmitting the selected material data is given, the computing device 1 may perform a function of the delivery source device. In this case, the delivery source device may include material data in data to be transmitted to the delivery destination device. On the other hand, when the computing device 1 receives the material data from the delivery source device, the computing device 1 may perform a function of the delivery destination device and the computing device 1 may output material according to the received material data.

Figure 4A:
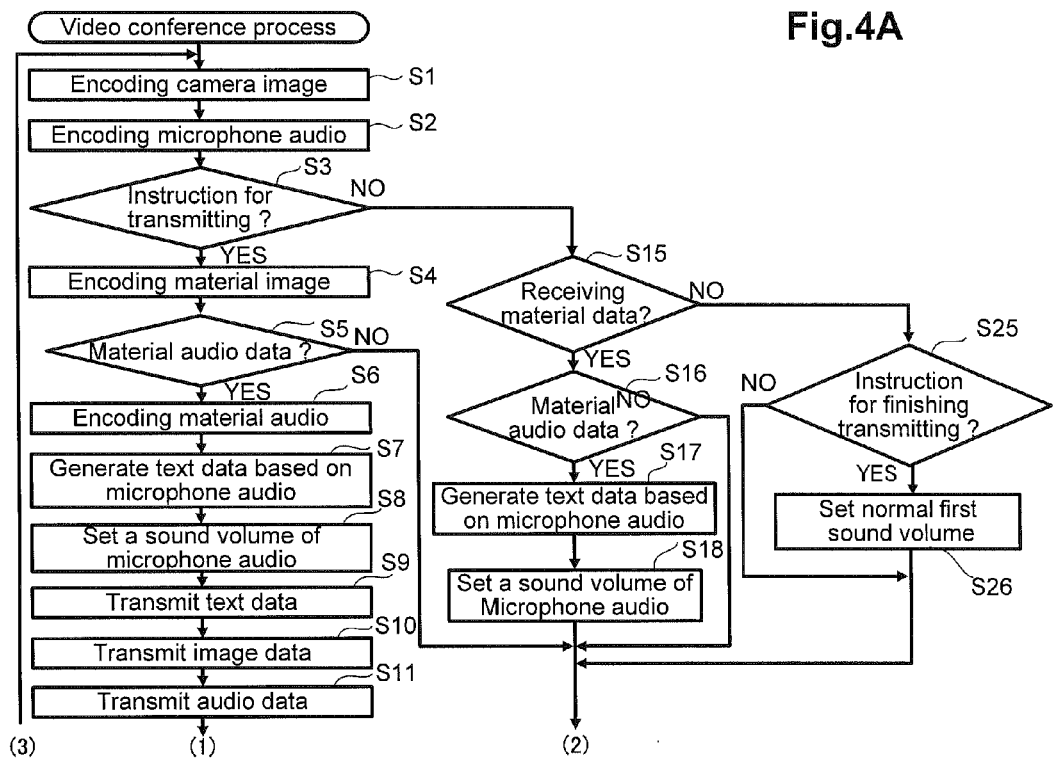
FIG. 4A is a flowchart depicting a video conferencing process of the PC 1 in the first illustrative embodiment according to one or more aspects of the disclosure.
Figure 4B:
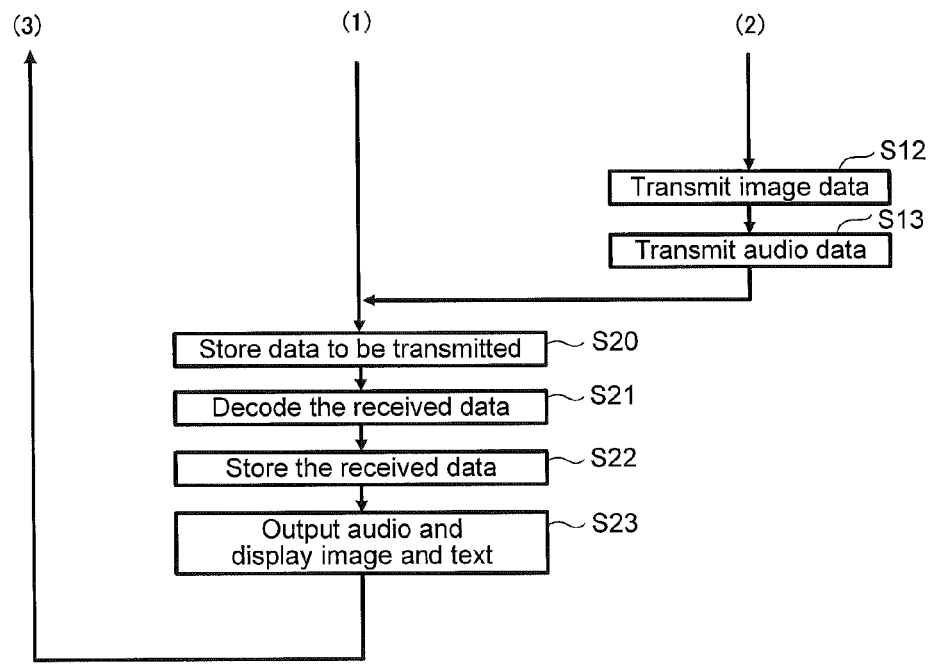
FIG. 4B is a flowchart depicting a video conferencing process of the computing device 1 in the first illustrative embodiment according to one or more aspects of the disclosure.

As depicted in FIGS. 4A and 4B, in the video conference process, first, the CPU10 may execute a process of encoding the camera image data acquired by the camera 34 (step S1). The CPU 10 may execute a process of encoding the microphone audio data inputted by the microphone 31 (steps S2).

Then, the CPU 10 may determine whether an instruction for transmitting the material data to other computing devices 1 (e.g., the computing device 1B and computing device 1C), which participate in the video conference with the computing device 1 (e.g., the computing device 1A), has been inputted or not (step S3). In other words, at step S3, the CPU 10 may determine whether the computing device 1 is the delivery source device or not. At step S3, the CPU 10 may determine whether the CPU 10 is transmitting the material data to another computing device 1 (e.g., the computing device 1B and computing device 1C) participating in the video conference with the computing device 1 (e.g., the computing device 1A) or not. When the CPU 10 determines that an instruction for transmitting the material data has been inputted by the operating device 35 or that the material data is being transmitted to another computing device 1 (step S3: YES), the CPU 10 may determine whether the material data instructed at step S3 includes the material image data and may execute a process of encoding the material image data of the instructed material data when the material image data is included (step S4). If the material image data is not included, the process proceeds to step S12. When the CPU10 determines that an instruction for transmitting the material data has not been inputted by the operating device 35 or that the material data is not being transmitted to another computing device 1 (step S3: NO), the CPU10 may execute step S15.

After the CPU10 executes step S4, the CPU10 may determine whether the material data instructed at step S3 includes the material audio data or not (step S5). At step S5, the CPU10 may determine whether the material data instructed at step S3 includes material audio data based on a file extension of the material data, when the material data stored in the HDD 13 is shared. For example, the CPU10 may determine that the material data includes material audio data, when the CPU10 determines that an extension of a data file related to the material data is "way", or "mp3", or "mp4" etc. When the CPU10 shares a web site which includes audio data, the CPU10 may determine whether the material data includes the material audio data based on a type of an application running in the web site or not.

The CPU10 may execute a process of encoding the material audio data (step S6), when the CPU10 determines that the material data includes the material audio data (step S5: YES). The CPU 10 may execute a process of audio or voice recognition on the microphone audio data inputted through the microphone 31 and generate text data of utterance content (e.g., speech) included within the microphone audio data (step S7). Furthermore, the CPU10 may set a sound volume of the microphone audio data and a sound volume of the material audio data such that the sound volume of the microphone audio data is lower than the sound volume of the material audio data (step S8), when the CPU 10 transmits the material audio data and microphone audio data to another computing device 1. In the first illustrative embodiment, a sound volume of microphone 31 is set at a first sound volume. In the first embodiment, at step S8, a sound volume of microphone 31 is changed from the first sound volume to a second sound volume which is lower than the first sound volume. Specifically, the CPU 10 may determine a third sound volume of the material audio data. In some examples, the third sound volume may be a pre-determined volume set by the installed program in the computing device 1. That is, the third sound volume may represent a volume of the material audio data outputted by an application on the computing device 1 according to an installed program for executing a video conference. At step S8, the CPU10 may determine the second sound volume which is lower than the third sound volume. The CPU10 may then set the second sound volume on a volume of the microphone 31. Specifically, the CPU10 may instruct the OS to set the second sound volume as a volume of the microphone 31 and output the material audio data with the third sound volume. The CPU 10 may instruct the OS to output audio based on the microphone audio data at the second sound volume. As a result of above-mentioned process, the microphone audio data may be transmitted to other computing device 1 at the second sound volume. In some examples, instead of determining the second sound volume based on the third sound volume, the CPU 10 may calculate the second sound volume by reducing the first sound volume by a predetermined value. Further, the CPU 10 may transmit the text data generated at step S7 to the delivery destination device (step S9). The CPU 10 may transmit the camera image data encoded at step S1 and the material image data encoded at step S4 to the delivery destination device (step S10). Furthermore, the CPU 10 may transmit the material audio data and microphone audio data to the delivery destination device (step S11). In this case, the CPU 10 may transmit the material audio data encoded at step S2 to one of a plurality of channels of the delivery destination device and the microphone audio data encoded at step S6 to another of the plurality of channels of the delivery destination device. Therefore, the delivery destination device can output audio based on the microphone audio data through one of the first speaker 32 and the second speaker 33, and audio based on the material audio data through the other speaker. For example, the delivery destination device can output audio based on the microphone audio data through the first speaker 32 and output audio based on the material audio data through the second speaker 33.

When the CPU 10 determines that the computing device 1 is the delivery source device (Step S3: YES) at step 3, and the CPU 10 determines that the material data does not include audio data (step S5: NO) at step S5, the CPU 10 may transmit the camera image data encoded at step S1 and the material image data encoded at step S4 to the delivery destination device (step S12). Furthermore, the CPU 10 may transmit the microphone audio data encoded at step S2 to the delivery destination device (step S13). In this case, the microphone audio data encoded at step S2 may be outputted by the first speaker 32 and the second speaker 33 at a normal (e.g., unmodified) first sound volume. The normal first sound volume may be used as a sound volume of microphone audio data when material audio data is not shared among a plurality of computing devices 1 in the video conference. The normal first sound volume may be larger than a sound volume of the microphone audio data when the material audio data is shared among a plurality of computing devices 1 in the video conference.

When the CPU 10 determines that the computing device 1 is not the delivery source device (step S3: NO) at step S3, the CPU 10 may determine whether the computing device 1 is receiving the material data from another computing device 1 or not (step S15). When the CPU 10 determines that the PC1 is receiving the material data (step S15: YES), the CPU 10 may determine whether the received material data includes material audio data or not (step S16). When the CPU 10 determines that the received material data includes material audio data (step S16: YES), the CPU 10 may execute a process of audio or voice recognition on the microphone audio data inputted through the microphone 31 and generate text data of utterance content represented by the microphone audio data (step S17). The CPU 10 may set a sound volume of the microphone data inputted through the microphone 31 such that the sound volume of the microphone audio data is lower than a sound volume of the material audio data received at step S15, when the computing device 1 functions as the delivery source device (step S18). In this case, a sound volume of microphone 31 may be set at the first sound volume. In this case, a sound volume of microphone 31 may be changed from the first sound volume to the second sound volume which is lower than the first sound volume. Specifically, the CPU 10 may determine the third sound volume of the material audio data based on the material audio data received at step S15. At step S18, the CPU 10 may determine the second sound volume so that the second sound volume is lower than the third sound volume. The CPU 10 may set the second sound volume on a volume of the microphone 31. More specifically, the CPU 10 may instruct the OS to set the second sound volume as a volume of the microphone 31 and output the material audio data at the third sound volume. The CPU 10 may instruct the OS to output audio based on the microphone audio data at the second sound volume. As a result of above-mentioned process, the microphone audio data is transmitted to another computing device 1 at the second sound volume. Instead of setting the second sound volume to be lower than the third sound volume, the CPU 10 may set the second sound volume by reducing the first sound volume by a pre-determined value. Accordingly, a sound volume of all of the microphone audio data outputted by the computing device 1A, computing device 1B, and computing device 1C is lower than a sound volume of the material audio data, when the material audio data is shared among the computing device 1A, computing device 1B, and computing device 1C. Further, the CPU 10 may transmit the camera image data encoded at step S1 to another computing device 1 (step S12). Moreover, the CPU 10 may transmit the microphone audio data at the sound volume set at step S18 to another computing device 1 (step S13). At step S13, the CPU 10 may also transmit the text data generated at step S17 to another computing device 1. Similarly, when the CPU 10 determines that the received material data does not include material audio data (step S16: NO), the CPU 10 may transmit the camera image data and microphone audio data to another computing device 1 (step S12 and step S13).

The CPU 10 may determine whether the CPU 10 has received an instruction indicating that transmitting the material data has finished or not (step S25), when the CPU 10 determines that the CPU 10 is not receiving the material data (Step S15: NO). The instruction may signify that transmission of a piece of the material data has been completed or that a user has chosen to stop receiving a piece of the material data. When the CPU 10 determines that the CPU 10 has received the instruction (step S25: YES), the CPU 10 may execute step S26. When the CPU 10 determines that the CPU 10 has not received the instruction from the delivery source device (step S25: NO), the CPU 10 may execute step S12.

When the CPU 10 determines that the CPU 10 has received the instruction for finishing transmitting the material data (step S25: YES), the CPU 10 may set the normal first sound volume on a sound volume of the microphone audio data (step S26). The normal first sound volume may represent a sound volume of microphone audio data when material audio data is not shared among a plurality of computing devices 1 in the video conference. The normal first sound volume may be higher than a sound volume of the microphone audio data when the material audio data is shared among a plurality of computing devices 1 in the video conference.

After executing step S11 or step S13, the CPU 10 may store the data which is transmitted to other computing devices 1 in the HDD 13 (step S20). The CPU 10 may also receive the data from another computing device 1, and decode the received data (step S21). The received data at step S21 may include the microphone audio data inputted by another computing device 1 and the camera image data acquired by another computing device 1. When the CPU10 receives the material data from another computing device 1, the received material data may include the material audio data, material image data, and text data. The CPU10 may store the data received at step S21 in the HDD13 (step S22). The data transmitted and received during the video conference is stored in the HDD 13 and the stored data can be outputted by the computing device 1, and a user of the video conference can confirm content of the video conference after finishing the TV conference. Then, the CPU10 may instruct the display device 35 to display image and text based on the data received at step S21 and instruct the first speaker 32 and the second speaker 33 to output audio based on the data received at step S21 (step S23).

At step S23, the CPU10 outputs audio based on the microphone audio data through one speaker from among the first speaker 32 and the second speaker 33, and audio based on the material audio data through the other speaker. The CPU10 may output the microphone audio data at the first sound volume set at step S8 or step S18, when the material audio data is shared among a plurality of the computing device 1. The CPU10 may output the material audio data at the second sound volume set at step S8 or step S18, when the material audio data is shared among a plurality of the PC1. A sound volume of audio outputted by the first speaker 32 and the second speaker 33 can be changeable by operating the operating device 36, however, a magnitude relationship between a sound volume of the microphone audio data and a sound volume of the material audio data is not changed. Accordingly, audio based on the material audio data may be outputted by either one of the first speaker 32 or the second speaker 33 and audio based on the material audio data may be outputted at a sound volume that is higher than that of the microphone audio data. After that, the CPU10 may return to step S1. The processes from step S1 to step S23 may be executed by a CPU10 repeatedly in each of the computing devices 1 participating in the video conference. The CPU10 may finish the video conference process, when an instruction for finishing the video conference is inputted to the computing device 1 using the operating device 36 (not shown in Figures).

As described above, in the first illustrative embodiment, the computing device 1 can control a sound volume of the microphone audio data according to the material audio data, when the material audio data is shared among a plurality of computing devices 1. The computing device 1A may set the second sound volume on a sound volume of the microphone 31 connected to the PC 1A and the second sound volume may be lower than the third sound volume of the material audio data. Accordingly, even though the material audio data is shared among a plurality of computing devices 1 in the video conference, the computing device 1 may enable a user of the computing device 1 to distinguish audio outputted based on the material audio data at the third sound volume which is higher than a sound volume of the microphone audio data.

The computing device 1 can output audio based on the microphone audio data by either one speaker of the first speaker 32 and the second speaker 33, and audio based on the material audio data by another speaker. Accordingly, the computing device 1 enables a user of computing device 1 to hear audio outputted based on the material audio data easily, in order to output audio based on the microphone audio data by either one speaker of the first speaker 32 and the second speaker 33, and audio based on the material audio data by another speaker.

The computing device 1A can generate text data based on the microphone audio data inputted by the microphone 31 connected to the computing device 1A, when the computing device 1A shares the material audio data among the computing device 1A, computing device 1B, and computing device 1C. Then, the computing device 1 can display text based on the text data in the display device 35 connected to computing device 1. Accordingly, a user of the computing device 1 can hear audio outputted based on the material audio data, and see text which represents utterance content inputted by the microphone 31 in the display device 35.

The computing device 1 can store the microphone audio data and the material audio data at step S8, and the text data generated at step S7 in the HDD at step S20 and step S22. The CPU10 may output the microphone audio data at the second sound volume which is lower than the third sound volume of the material data by the first speaker 32 and the second speaker 33, only when there is a signal for generating audio outputted by the first speaker 32 and the second speaker 33 based on the material audio data.

In this case, even though the material data is shared among a plurality of computing devices 1, the CPU 10 might not set the second sound volume of the microphone audio data, when the computing device 1 determines that there is no material audio data in the material data. Accordingly, a user of the computing device 1 may easily understand utterance content based on the microphone audio data.

With respect to FIG. 5, FIG. 6, and FIG. 7, a second illustrative embodiment will be described. A communication system 200 may be different from the communication system 100 in the first example embodiment (see FIG. 1). Notably, the communication system 200 comprises a server 101. The sever 101 may be configured to control the video conference (e.g., TV conference).

With respect to FIG. 5, a configuration of a communication system 200 will be described. The communication system 200 comprises the server 101 and a plurality of PC102. For example, PC102A may be configured to transmit and receive various data and instructions to and from PC102B and PC102C via network 8, for example, the Internet. As a result, image data, audio data, and material data inputted by each of PC 102 can be shared in the communication system 200. Similar to the first illustrative embodiment, in the second illustrative embodiment, a communication device in this disclosure is not limited to the personal computers (PC) 102 and the communication device may be a specialized video conference device configured to execute a video conference (e.g., TV conference).

Figure 5:
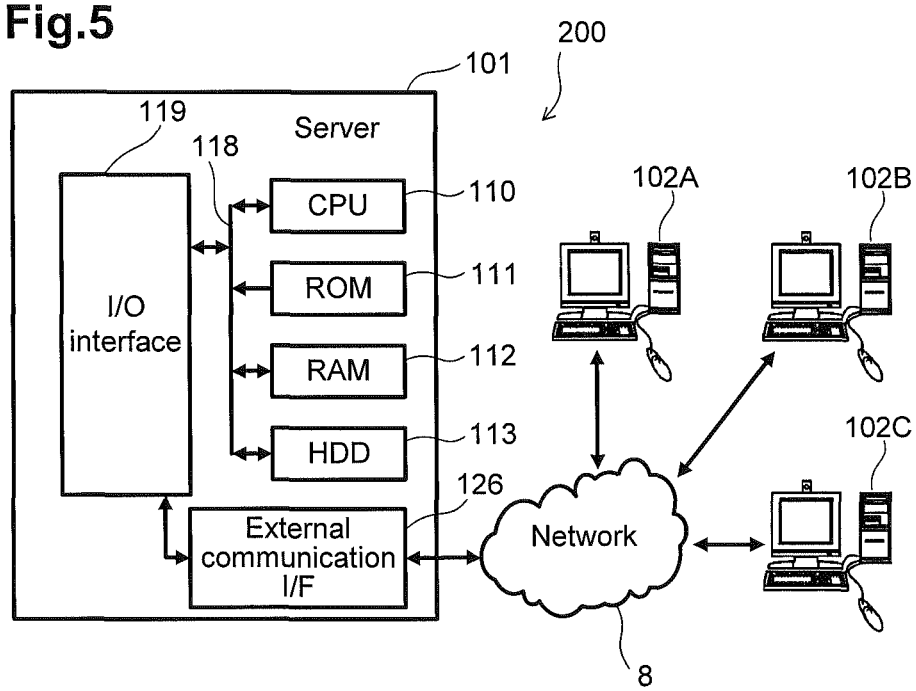
FIG. 5 depicts a configuration of a communication system 200 in a second illustrative embodiment according to one or more aspects of the disclosure.

With reference to FIG. 5, an electrical configuration of the server 101 will be described. The server 101 may comprise a CPU 110, a ROM 111, a RAM 112, a HDD113, and I/O interface 119. The CPU 110, the ROM 111, the RAM 112, the HDD 113, and the I/O interface 119 may be connected with each other via a bus 118. An external communication I/F 126 may be connected to the I/O interface 119. The external communication I/F 126 may be configured to allow the recording server 3 to connect to the network 8. The server 101 is configured to store, in the HDD 113 or other memory thereof, a server program for allowing the CPU 110 of the server 101 to perform the remote conference control. The PC 102 may have the same electrical configuration as the computing device 1 in the first illustrative embodiment (see FIG. 3). Accordingly, detailed description of the PC 102 will be omitted.

Figure 6:
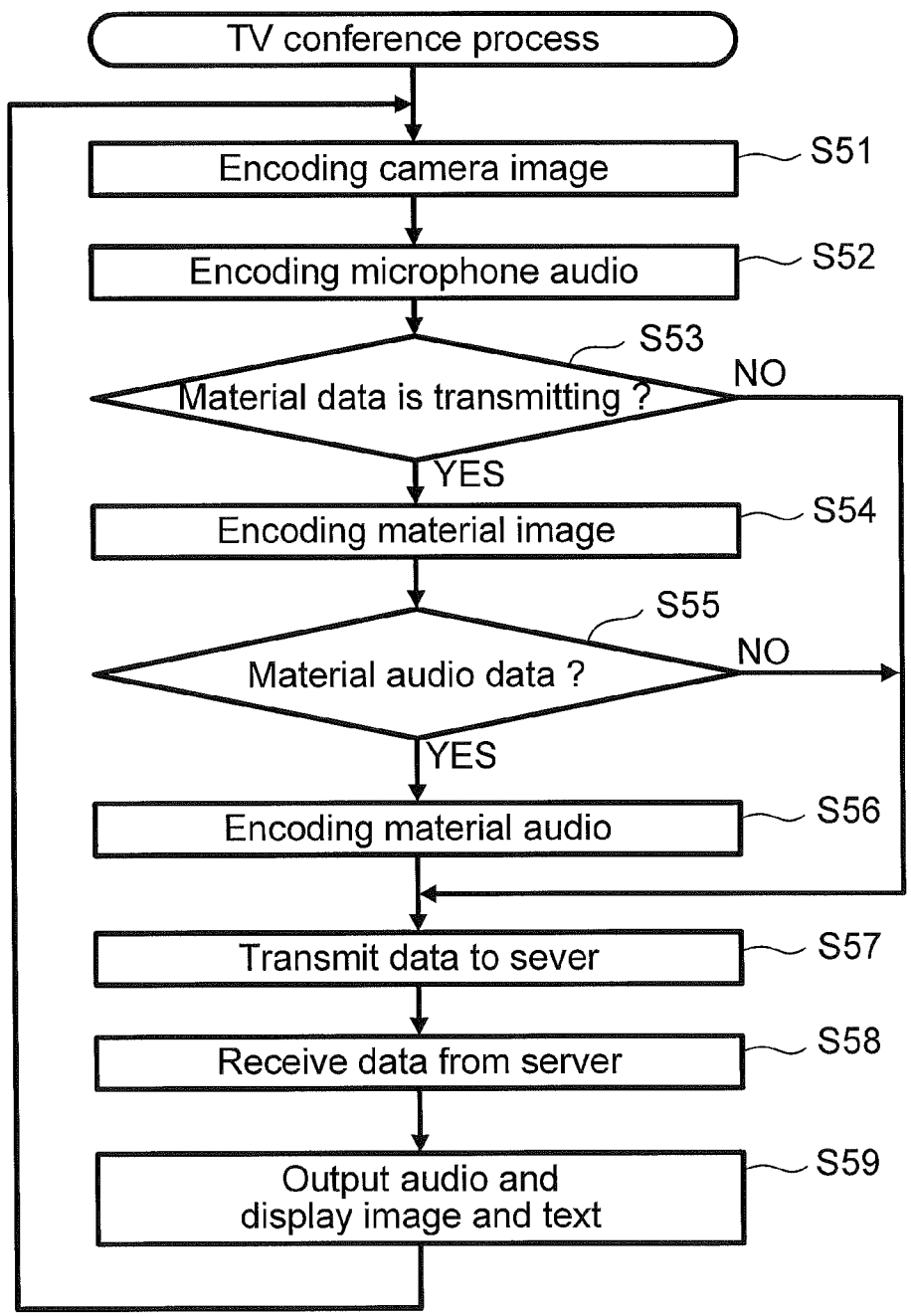
FIG. 6 is a flowchart depicting a video conferencing process of a computing device 102 in the second illustrative embodiment according to one or more aspects of the disclosure.

With reference to FIG. 6, a video conference process performed by the PC 102 in the second illustrative embodiment will be described. The CPU 10 of the PC 102 may execute the video conference process depicted in FIG. 6, when an instruction for starting the video conference is inputted in the PC 102. The CPU 10 may execute a process of encoding the camera image data acquired by the camera 34 (step S51).

Then, the CPU 10 may execute a process of encoding the microphone audio data inputted by the microphone 31 (step S52). The CPU 10 may determine whether the material data is transmitting to other PCs 102 or not (step S53). The CPU 10 may execute step S57, when the CPU 10 determines that the material data is not transmitting to the other PC102 (step S53: NO). The CPU 10 may execute a process of encoding the material image data of the material data (step S54), when the CPU 10 determines that the material data is transmitting to the other PC102 (step S53: YES). Then, the CPU 10 may determine whether the material data to be transmitted includes the material audio data or not (step S55). When the CPU 10 determines that the material data to be transmitted does not include the material audio data (step S55: NO), the CPU 10 may execute step S57. When the CPU 10 determines that the material data to be transmitted includes the material audio data (step S55: YES), the CPU 10 may execute a process of encoding the material audio data (step S56).

The CPU 10 may transmit the encoded image data and audio data to the server 101 (step S57). At step S57, the CPU 10 may transmit, to the server 101, the material audio data using one of a plurality of channels and the microphone audio data using another one or more of the plurality of channels, when the CPU10 determines that the data to be transmitted at step S57 includes both the microphone audio data and the material audio data. The CPU 10 may receive data from the server 101 (step S58).

The CPU 10 may output audio by the first speaker 32 and the second speaker 33 based on the data received at step S58, and display image based on the data received at step S58 in the display device 35 (step S59). At step S59, the CPU 10 may also execute a process of displaying text in addition to image data based on the received text data, when the received data includes text data. At step S59, the CPU 10 may instruct the OS to set the second sound volume on a volume of the microphone 31 and output the material audio data at the third sound volume. The CPU 10 may instruct the OS to output audio based on the microphone audio data at the second sound volume. At step S59, the CPU 10 may output audio based on the microphone audio data through one of the first speaker 32 and the second speaker 33, and audio based on the material audio data through the other speaker, when the CPU 10 receives the microphone audio data and the material audio data in different channels. As a result, a user of the PC102 can hear and understand the microphone audio data and the material audio data easily. After that, the CPU10 may return to step S51. Then, the CPU 10 may finish the video conference process, when an instruction for finishing the video conference is inputted to the PC 102 using the operating device 36 (not shown in Figures). The processes from steps S51 to step S59 are executed by the CPU 10 repeatedly as long as the instruction for finishing the video conference is not inputted to the PC 102.

Figure 7:
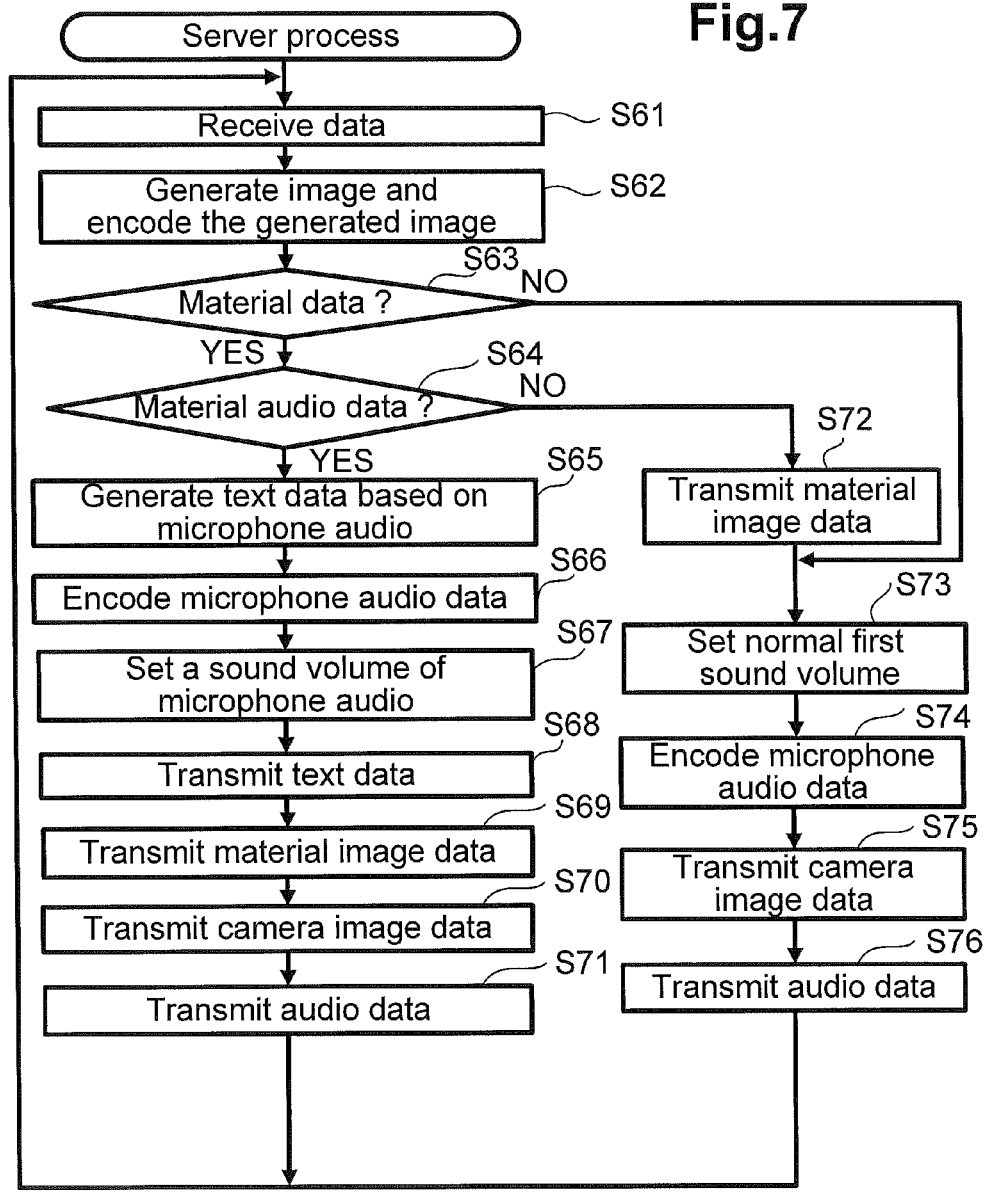
FIG. 7 is a flowchart depicting a server process of server 101 in the second illustrative embodiment according to one or more aspects of the disclosure.

With reference to FIG. 7, a server process performed by the server 101 in the second illustrative embodiment will be described. The CPU 110 of the server 101 may start to execute the server process according to the stored program in the HDD113, when the CPU 110 receives an instruction to start the video conference from any of the PCs 102. The CPU 110 may receive the microphone audio data and the camera image data from each of the PCs 102 in the video conference (step S61). Then, the CPU 110 may execute a process of generating image data to be displayed in the display 35 of PC 102 based on the camera image data received at step S61 and encoding the generated image data (Step S62). At step S62, the CPU 110 may execute a process of generating image data to be displayed in the display 35 of PC 102 based on the camera image data and material image data received at step S1, when the material data is shared among a plurality of PCs 102 in the remote conference.

The CPU 110 may determine whether the data received at step S61 includes material data or not (step S63). In other words, at step S63, the CPU 110 determines whether material data is shared among a plurality of PC102 in the remote conference. The CPU 110 may execute step S64, when the CPU 110 determines that the data received at step S61 includes material data (step S63: YES). The CPU may execute step S73, when the CPU 110 determines that data received at step S61 does not include material data (step S63: NO). The CPU 110 may determine whether the material data received at step S61 includes the material audio data or not (step S64). The CPU 110 may execute step S65, when the CPU 110 determines that the material data received at step S61 includes the material audio data (step S64: YES). The CPU 110 may execute step S72, when the CPU 110 determines that the material data received at step S61 does not include the material audio data (step S64: NO).

The CPU 110 may execute a process of audio or voice recognition on the microphone audio data received at step S61 and generates text data of utterance content which is represented by the microphone audio data received at step S61 (step S65), when the CPU 110 determines that the data received at step S61 includes the material audio data (step S64: YES).

The CPU 110 may execute a process of encoding the microphone audio data received at step S61 (step S66). Furthermore, the CPU 110 may set a sound volume of the microphone audio data encoded at step S66 and a sound volume of the material audio data such that the sound volume of the microphone audio data is lower than the sound volume of the material audio data (step S67). In this case, the server 101 may receive the microphone audio data at the first sound volume at step S61. At step S67, a sound volume of microphone audio data may be changed from the first sound volume to the second sound volume which is lower than the first sound volume. Specifically, the CPU 110 may determine the third sound volume of the material audio data based on the material audio data received at step S61. At step S67, the CPU 110 may determine the second sound volume which is lower than the third sound volume. Instead of determining the second sound volume which is lower than the third sound volume, the CPU110 may determine the second sound volume by reducing the first sound volume by a pre-determined value.

The CPU 110 may transmit the text data generated at step S65 to a plurality of the PCs 102 (Step S68). The CPU 110 may transmit the material image data to a plurality of the PCs 102 in the remote conference (step S69). The CPU 110 may transmit the image data generated at step S62 to a plurality of the PCs 102 in the remote conference (step S70). Furthermore, the CPU 110 may transmit the material audio data and microphone audio data received at step S61 to a plurality of the PCs 102 (step S71). In this case, the CPU 110 may transmit the microphone audio data at the second sound volume to a plurality of the PCs 102 in the remote conference. The CPU 110 may also transmit the material audio data at the third sound volume to a plurality of the PCs 102 in the remote conference. The CPU 110 may transmit the material audio data on one or more of a plurality of channels and the microphone audio data on one or more other channels of the plurality of channels to a plurality of the PCs 102. That is, the CPU 110 can output audio based on the microphone audio data received through one of the first speaker 32 and the second speaker 33, and audio based on the material audio data received through the other speaker, when the CPU 10 receives the microphone audio data and the material audio data through different channels. At step S71, instead of transmitting the material audio data using one of a plurality of channels and the microphone audio data using other channels of the plurality of channels to a plurality of the PCs 102, the CPU 110 may combine the microphone audio data at the second sound volume and the material audio data at the third sound volume, and transmit the combined audio data to a plurality of the PCs 102 using one or more channels. After that, the CPU 110 may execute step S61.

The CPU 110 may execute step S72, when the CPU 110 does not determine that the data received at step S61 includes the material audio data (step S64: NO). At step S72, the CPU 110 may transmit the material image data received at the step S61 to a plurality of the PCs 102 in the remote conference (step S72). The CPU 110 may determine a sound volume of the microphone audio data (step S73). Specifically, the CPU 110 may set the normal first sound volume on a sound volume of the microphone audio data. The normal first sound volume may represent a sound volume of microphone audio data when the material audio data is not shared among a plurality of PCs 102 in the video conference. The normal first sound volume is higher than a sound volume of the microphone audio data when the material audio data is shared among a plurality of PCs 102 in the video conference. In more detail, the CPU 110 may execute a process of encoding the microphone audio data received at step S61 (step S74). The CPU 110 may transmit the image data generated at step S62 to a plurality of the PCs 102 (step S75). The CPU 110 may transmit, to a plurality of the PCs 102, the microphone audio data at the second sound volume (step S76). Then, the CPU 110 may execute step S61.

As described above, in the second illustrative embodiment, the server 101 can control a sound volume of the microphone audio data according to the material audio data, when the material audio data is shared among a plurality of PCs 102. The server 101 can set the second sound volume on a sound volume of the microphone 31 connected to the PC 102 in the remote conference so that the second sound volume may be lower than the third sound volume of the material audio data. Accordingly, even though the material audio data is shared among a plurality of PCs 102 in the remote conference, the server 101 may enable a user of the PC 102 to understand audio outputted based on the material audio data at the third sound volume which is higher than a sound volume of the microphone audio data.

Figure 8B:
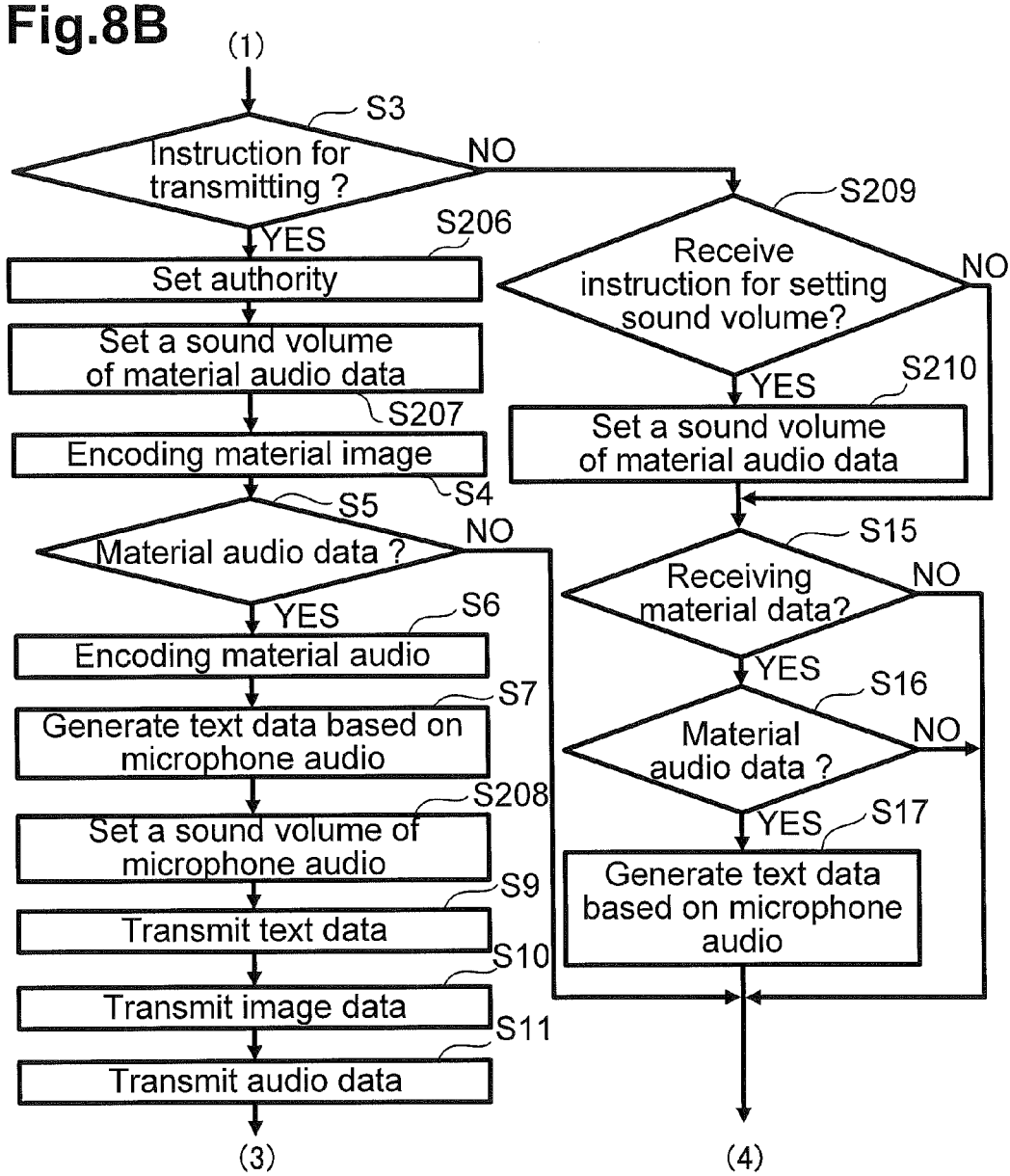
FIG. 8B is a flowchart depicting a video conferencing process of the PC 1 in a third illustrative embodiment according to one or more aspects of the disclosure.

With reference to FIG. 8A, FIG. 8B, and FIG. 8C, a third illustrative embodiment will be described. A configuration of a communication system on which the third illustrative embodiment may be implemented may be similar to the communication system 100 of the first illustrative embodiment as depicted in FIG. 1. An electrical configuration of each computing device 1 in the third illustrative embodiment may be similar to the configuration depicted in FIG. 3. With reference to FIGS. 8A-8C, a video conference process (e.g., a TV conference process) performed by the computing device 1 in the third illustrative embodiment will be described.

In the third embodiment, an explanation will be given mainly for the different parts from the first embodiment, and an explanation will be omitted for the common parts by assigning the same reference numerals thereto. For example, when a power switch of the computing device 1 is turned on and the computing device 1 receives an instruction for starting the video conference, the CPU 10 may activate the program stored in the HDD 13 or other memory.

A user of the computing device 1A that is to be a host of the video conference may determine one or more of the computing devices 1 which are desired to participate in the video conference from among a plurality of computing devices 1 that are capable of using the communication system 100. First, the computing device 1A that is the host of the video conference may issue a conference request for performance of the video conference to a particular server. At that time, the conference request issued to the particular server may include the terminal IDs of the computing device 1B and computing device 1C that are to be used by participant users of the video conference and the terminal ID of the computing device 1A that is to be used by the host user of the video conference. That is, the conference request may include the terminal IDs and additional information representing that the computing device 1A is the host of the video conference and the computing device 1B and computing device 1C are the participants of the video conference. Authority information may also be assigned to the computing device 1A that is the host of the video conference. More specifically, when the computing device 1A activates the program for executing the video conference and is specified as the host of the video conference, the authority information may be assigned to the computing device 1A. The assigned authority information may be temporarily stored in a pre-determined storage area of the RAM 12. As described above, the CPU 10 of computing device 1A may start the flowchart depicted in FIG. 8, when the computing device 1A issues the conference request. The CPU 10 of the computing device 1B or computing device 1C may also start the flowchart depicted in FIGS. 8A-8C, when the computing device 1B or computing device 1C receives the conference request.

As depicted in FIG. 8A, the CPU 10 may determine whether the computing device 1 is the host of the TV conference or not (step S201). Specifically, at step S201, CPU 10 may determine whether the authority information is stored in a pre-determined storage area of the RAM 12 or not. The CPU 10 may determine that the PC 1 is the host, when the CPU 10 determines that the authority information is stored in a pre-determined storage area of the RAM 12. On the other hand, the CPU 10 may determine that the computing device 1 is not the host, when the CPU 10 determines that the authority information is not stored in a pre-determined storage area of the RAM 12. The CPU 10 may execute step S202, when the CPU 10 determines that the computing device 1 is the host of the video conference (step S201: YES). The CPU 10 may execute step S204, when the CPU 10 determines that the PC1 is not the host of the video conference (step S201: NO).

The CPU 10 may determine whether an instruction for changing a sound volume has been requested or not (step S202). The CPU 10 may execute step S203, when the CPU determines that the instruction for changing a sound volume has been requested (step S202: YES). The CPU 10 executes step S204, when the CPU determines that the instruction for changing a sound volume has not been requested (step S202: NO).

The CPU 10 may set a sound volume on a microphone 31 of another computing device 1 participating in the video conference with the computing device 1 (step S203). Specifically, an explanation using an example video conference involving the computing device 1A, computing device 1B, and computing device 1C, where the computing device 1A executes step S203 will be described. In this example, each of the computing device 1A, computing device 1B, and computing device 1C may execute the program of the video conference on the OS installed in each of the computing device 1A, computing device 1B, and computing device 1C. An application of the video conference among the computing device 1A, computing device 1B, and computing device 1C is executed by activating each installed program of the video conference in each of the computing device 1A, computing device 1B, and computing device 1C. In this case, the computing device 1A may transmit, to the computing device 1B and computing device 1C, an instruction for changing a sound volume setting of the microphone 31 of the computing device 1B and computing device 1C using the application. The instruction for changing a sound volume setting may include a target sound volume that the microphone should be changed to.

The computing device 1A can change a sound volume outputted by the first speaker 32 and the second speaker 33 of the computing device 1A, by changing a sound volume setting of the microphone 31 of the computing device 1B and the microphone 31 of the computing device 1C according to the instruction for changing a sound volume. The computing device 1B and computing device 1C may change a sound volume on the microphone 31 of the computing device 1B and the microphone 31 of the computing device 1C, when the computing device 1B and computing device 1C receive the instruction for changing a sound volume. For example, the computing device 1B and computing device 1C may instruct the OS to set a sound volume setting of the microphone 31 of the computing device 1B and computing device 1C according to the received instruction. As a result, the computing device 1A can output microphone audio data transmitted from the computing device 1B and computing device 1C at a modified sound volume through the first speaker 32 and second speaker 33 of the computing device 1A.

The CPU 10 may determine whether the instruction for changing a sound volume has been received or not (step S204). The CPU 10 may execute step S205, when the CPU 10 determines that the instruction for changing a sound volume has been received (step S204: YES). The CPU 10 may execute step S1, when the CPU 10 does not determine that the instruction for changing a sound volume has been received (step S204: NO).

The CPU 10 may change a sound volume of the microphone 31 according to the instruction for changing a sound volume received at step S204 (step S205). Specifically, the CPU 10 may change a sound volume setting of the microphone 31 according to the instruction for changing a sound volume in response to receiving, by the CPU 10, the instruction for changing a sound volume. Then, the CPU 10 may instruct the OS to set a sound volume setting of the microphone 31 to a new level.

The CPU 10 may set authority information (step S206), when the CPU 10 determines that the instruction for transmitting the material data has been inputted (step S3: YES). Specifically, at step S206, the CPU 10 may store the authority information in a pre-determined storage area of the RAM 12.

The CPU 10 may set a sound volume of the material audio data (step S207). Specifically, at step S207, the CPU 10 may set the third sound volume as a sound volume of the material audio data. At step S207, the CPU 10 may set a pre-determined third sound volume as a sound volume of the material audio data. The CPU 10 may set the third sound volume based on a user selection which is inputted by the operating device 36.

The CPU 10 may determine the second sound volume which is lower than the third sound volume (step S208). Then the CPU 10 may set the second sound volume on the microphone 31 of the computing device 1. For example, the computing device 1A may transmit, to the computing device 1B and computing device 1C, the instruction for changing a sound volume on the microphone 31 of the computing device 1B and computing device 1C using the application. Specifically, the CPU 10 may transmit, to the computing device 1B and computing device 1C, the instruction for setting the second sound volume on the microphone 31 of the PC1B and the microphone 31 of the PC1C, and may set the third sound volume for the material audio data. As a result of step S204, the computing device 1B and computing device 1C may set the second sound volume on the microphone 31 of the computing device 1B and computing device 1C according to the instruction for changing a sound volume. Then, the computing device 1B and computing device 1C may instruct the OS of the computing device 1B and computing device 1C to set the second sound volume on the microphone 31 of the computing device 1B and computing device 1C. At step S208, instead of determining the second sound volume which is lower than the third sound volume, the CPU 10 may determine the second sound volume by reducing the first sound volume by a pre-determined value. Then the CPU 10 may transmit, to the computing device 1B and computing device 1C, an instruction for reducing the first sound volume of the microphone 31 of the computing device 1B by a predetermined value and reducing the first sound volume on the microphone 31 of the computing device 1C by a predetermined value. In this case, the computing device 1A, computing device 1B, and computing device 1C can keep a ratio among a sound volume set at step S203 in the computing device 1A, a sound volume set at step S203 in the computing device 1B, and a sound volume set at step S203 in the computing device 1C, so that a user of each of the computing device 1A, computing device 1B, and computing device 1C can hear and recognize audio based on the material audio data.

The CPU 10 may determine whether an instruction for setting a sound volume of a speaker used to output the material audio data has been received or not (step S209). The CPU 10 may execute step S210, when the CPU 10 determines that the instruction for setting a sound volume of the speaker used to output material audio data has been received (step S209: YES). The CPU 10 may execute step S15, when the CPU 10 determines that the instruction for setting a sound volume of the speaker that outputs material audio data has not been received (step S209: NO).

The CPU 10 may change a sound volume of the material data according to the third sound volume setting based on the instruction received at step S209 (step S210). Specifically, the CPU 10 may set the third sound volume of the speaker outputting the material audio data via the application of the video conference. Then, the CPU 10 may instruct the OS to change the volume of a speaker to output the material audio data according to the third sound volume.

The CPU 10 may determine whether transmission of the material data has been finished or not (step S211). The CPU 10 may execute step S212, when the CPU 10 determines that transmission of the material data has been finished (step S211: YES). The CPU 10 may execute step S20, when the CPU 10 determines that transmission of the material data has not been finished (step S211: NO).

The CPU 10 may set the normal first sound volume on a sound volume of the microphone audio data after the material audio data finishes streaming (step S212). The normal first sound volume may represent a sound volume of microphone audio data when the material audio data is not shared among a plurality of computing device 1 in the video conference. The normal first sound volume may be higher than a sound volume of the microphone audio data at the time when the material audio data is shared among a plurality of computing devices 1 in the video conference. At step S212, the CPU 10 also cancels the authority information. Specifically, the CPU 10 may delete the authority information stored temporarily in the RAM 12.

Configurations of devices and flowcharts of various processes depicted in the drawings do not limit the aspects of the disclosure but merely illustrate the aspects of the disclosure. For example, the computing device 1 in the first and third illustrative embodiments, and the server 101 in the second illustrative embodiment may output the microphone audio data at the second sound volume which is lower than the third sound volume of the material audio data, when the material audio data is shared (with reference to step S5 in FIG. 4A and step S64 in FIG. 7).

In some embodiments, the CPU 10 may output the microphone audio data at the second sound volume which is lower than the third sound volume of the material audio data, only when the computing device 1 and the server 101 determine that there is a signal for generating audio outputted by the first speaker 32 and the second speaker 33 based on the material audio data.

More specifically, the CPU 110 may determine whether there is a signal for generating audio based on the material audio data or not, when the CPU 110 determines that the data received at step S61 includes the material audio data (step S64: YES).

When the CPU 110 determines that there is a signal for generating audio based on the material audio data, the CPU 110 may execute step S66. When the CPU 110 determines that a signal for generating audio based on the material audio data has not been received, the CPU 110 executes step S72. In the first embodiment, the CPU 10 may determine whether there is a signal for generating audio based on the material audio data, when the CPU 10 determines that the material data includes the material audio data at step S5 as depicted in FIG. 4. A sound volume of the microphone audio data might not be lowered, when the material data which includes the material audio data is shared and there is no signal for generating audio based on the material audio data. For example, during a period of silence in the material audio data, the sound volume of the microphone for outputting audio data from users might not be lowered. Accordingly, the participants of the video conference can hear or understand audio based on the microphone audio data.

In the first illustrative embodiment, the computing device 1 may transmit the microphone audio data and the material audio data to another computing device 1, after the computing device 1 sets a sound volume of the microphone audio data based on the determination of whether material audio data is to be shared. The computing device 1 may determine whether the data received from another computing device 1 includes the material audio data or not at step S23 of FIG. 4. The computing device 1 may generate the text data based on the microphone audio data and display text based on the generated text data. Furthermore, the computing device 1 may output the microphone audio data at the second sound volume which is lower than the third sound volume of the material audio data, when the CPU 10 determines that the material audio data has been received.

In this case, CPU 10 outputs audio based on the microphone audio data through one of the first speaker 32 and the second speaker 33, and audio based on the material audio data through the other speaker. As described above, the computing device 1, the CPU 10 may control a sound volume of each of the microphone audio data and the material audio data, when the CPU 10 outputs audio based on the microphone audio data through one of the first speaker 32 and the second speaker 33, and audio based on the material audio data through the other speaker.

The computing device 1 may transmit, to the other computing device 1, the text data generated based on the microphone audio data. The computing device 1 may generate the text data based on the microphone audio data which is received from another computing device 1. In this disclosure, the computing device 1 may execute a process of outputting image and audio based on image data and audio data in the video conference. In some embodiments, the computing device 1 may also execute a process of outputting only audio based on audio data in the conference.

In the second example embodiment, the process of generating text data based on the microphone audio data may be executed by the server 101. The process of generating text data based on the microphone audio data may be executed by one or more of the PCs 102. In the second illustrative embodiment, instead of the server 101, a particular communication device (e.g., a personal computer which is configured to connect to the server 101 via a network 8) may execute the process of generating text data.

In this disclosure, the computing device 1 may control a sound volume of the microphone audio data. A control method of a sound volume of the microphone audio data may be changeable. For example, the computing device 1 may set the second sound volume which is lower than the third sound volume, when the material audio data is outputted at normal reproduction speed. And, in the same embodiment, the computing device 1 might not change a sound volume of the microphone audio data, when the material audio data is outputted in a fast-forward or slow-motion mode.

The computing device 1 may determine whether the material audio is related to voice data or non-voice data (e.g., music data). The computing device 1 may set the second sound volume which is lower than the third sound volume, when the PC1 determines that the material data is related to voice data.

The computing device 1 may set the second volume which is lower than the third volume, when the computing device 1 determines that material audio data is being output for a first time. Then, the computing device 1 might not change a sound volume of the microphone audio data, when the computing device 1 determines that material audio data has previously been outputted. Accordingly, the computing device may keep track of a number of times that a particular piece of material data is played. The computing device 1 may be configured to connect to the first speaker 32 and the second speaker 33 in the first illustrative embodiment and third illustrative embodiment. Similarly, the PC 102 may also be configured to connect the first speaker 32 and the second speaker 33 in the second illustrative embodiment. An audio output device in this disclosure is not limited to the first speaker 32 and the second speaker 33. For example, the computing devices 1 or the PCs 102 may be configured to connect to an earphone and a speaker. The earphone may be configured to be wearable on/in at least one ear. In this case, the computing device 1 or server 101 outputs audio based on the microphone audio data through one of the earphone and the speaker, and audio based on the material audio data by the other. One or more speakers may be connected to the computing device 1.

The computing device 1 and the server 101 might not execute a process of generating text data. The computing device 1 and the server 101 might not output the microphone audio data when the computing device 1 and server 101 instruct the display device 35 to display text based on the generated text data. That is, the computing device 1 and the server 101 might not output the material audio data, when the computing device 1 and the server 101 determine that the material data which is shared among a plurality of computing devices 1 or PCs 102 in the remote conference includes material audio data. The computing device 1 and the server 101 may output the material audio data at zero sound volume, when the computing devices 1 and the server 101 determine that the material data which is shared among a plurality of computing devices 1 or PCs 102 in the remote conference includes material audio data.

In the second illustrative embodiment, the server 101 might not execute a process of storing data (e.g., the microphone audio data and the material audio data received from the PC 102). In the second illustrative embodiment, the server 101 may execute a process of storing data (e.g., the microphone audio data and the material audio data received from the PC 102). In this case, after the server 101 receives an instruction for finishing the TV conference from any one of the PCs 102 participating in the video conference, the server 101 may transmit, to one or more of the PCs 102, the data stored in the HDD 113 of the server 101.

What is claimed is:

1. A communication device comprising
a processor; and
a memory configured to store computer-readable instructions therein that, when executed by the processor, cause the communication device to:
receive at least one of first image data and first audio data from a particular communication device configured to participate in a video conference with the communication device;
transmit to the particular communication device, at least one of second image data and second audio data;
output at least one of the received first image data through a display and the received first audio data through an audio output device having a first sound volume setting, wherein the display is configured to be connected to the communication device and the audio output device is configured to be connected to the communication device;
acquire material data configured to be shared with the particular communication device, when at least one of the first image data and first audio data is outputted;
determine whether the acquired material data includes audio data;
change the first sound volume setting to a second sound volume setting, in response to determining that the acquired material data includes audio data; and
output the first audio data through the audio output device having the second sound volume setting and the material data according to a third sound volume setting when determining that the material data includes audio data.

2. The communication device according to claim 1, wherein the second sound volume setting is determined by decreasing the first sound volume setting by a predetermined value.

3. The communication device according to claim 1, wherein the second sound volume setting is lower than the third sound volume setting.

4. The communication device according to claim 1, wherein the at least one of the first image data and the first audio data is received from a plurality of participating communication devices including the particular communication device;
wherein the transmitting of the at least one of the second image data and second audio data comprises transmitting the at least one of the second image data and second audio data to the plurality of participating communication devices; and
wherein the first audio data received from the plurality of participating devices is changed according to the second sound volume setting after the first sound volume setting is changed to the second sound volume setting.

5. The communication device according to claim 1, wherein the second image data is acquired by a first image acquiring device and the second audio data is inputted by a first audio input device, wherein the image acquiring device is configured to be connected to the communication device and the first audio input device is configured to be connected to the communication device,
wherein the first sound volume setting of the audio output device corresponds to a setting of a second audio input device configured to be connected to the particular communication device, and
wherein the changing of the first sound volume setting to the second sound volume setting comprises changing the first sound volume setting of the second audio input device via a network, in response to determining that the acquired material data includes audio data.

6. The communication device according to claim 4, wherein each of the plurality of the participating communication devices is configured to connect to a respective second audio input device, and
wherein the changing of the first sound volume setting to the second sound volume setting comprises changing the respective second audio input devices to have the second sound volume setting via a network, in response to determining that the acquired material data includes audio data.

7. One or more non-transitory computer-readable storage media storing computer-executable instructions that, when executed, cause a communication device to:
receive at least one of first image data and first audio data from a particular communication device configured to participate in a video conference with the communication device;
transmit to the particular communication device, at least one of second image data and second audio data;
output at least one of the received first image data through a display and the received first audio data through an audio output device having a first sound volume setting, wherein the display is configured to be connected to the communication device and the audio output device is configured to be connected to the communication device;
acquire material data configured to be shared with the particular communication device, when at least one of the first image data and first audio data is outputted;
determine whether the acquired material data includes audio data;
change the first sound volume setting to a second sound volume setting, in response to determining that the acquired material data includes audio data; and
output the first audio data through the audio output device having the second sound volume setting and the material data according to a third sound volume setting when determining that the material data includes audio data.

8. The one or more non-transitory computer-readable storage media according to claim 7,
wherein the second sound volume setting is determined by decreasing the first sound volume setting by a predetermined value.

9. The one or more non-transitory computer-readable storage media according to claim 7,
wherein the second sound volume setting is lower than the third sound volume setting.

10. The one or more non-transitory computer-readable storage media according to claim 7,
wherein the at least one of the first image data and the first audio data is received from a plurality of participating communication devices including the particular communication device,
wherein the transmitting of the at least one of the second image data and second audio data comprises transmitting the at least one of the second image data and second audio data to the plurality of participating communication devices, and
wherein the first audio data received from the plurality of participating devices is changed according to the second sound volume setting after the first sound volume setting is changed to the second sound volume setting.

11. The one or more non-transitory computer-readable storage media according to claim 7,
wherein the second image data is acquired by a first image acquiring device and the second audio data is inputted by a first audio input device, wherein the image acquiring device is configured to be connected to the communication device and the first audio input device is configured to be connected to the communication device,
wherein the first sound volume setting of the audio output device corresponds to a setting of a second audio input device configured to be connected to the particular communication device, and
wherein the changing of the first sound volume setting to the second sound volume setting comprises changing the first sound volume setting of the second audio input device via a network, in response to determining that the acquired material data includes audio data.

12. The one or more non-transitory computer-readable storage media according to claim 10,
wherein each of the plurality of the participating communication devices is configured to connect to a respective second audio input device, and
wherein the changing of the first sound volume setting to the second sound volume setting comprises changing the respective second audio input devices to have the second sound volume setting via a network, in response to determining that the acquired material data includes audio data.

13. The one or more non-transitory computer-readable storage media according to claim 12, wherein the computer-executable instructions further cause the communication device to:
determine whether authority information is set on the communication device, wherein the authority information represents an authority to change the first sound volume setting in a video conference among the plurality of the participating communication devices and the communication device via the network; and
change the first sound volume setting in the video conference via the network, in response to determining that the authority information is set on the communication device.

14. The one or more non-transitory computer-readable storage media according to claim 12,
wherein the second sound volume setting is lower than the third sound volume setting and wherein the third sound volume setting is a pre-determined sound volume setting.

15. The one or more non-transitory computer-readable storage media according to claim 14, wherein the computer-executable instructions further cause the communication device to:
detecting the material data to share among the plurality of the participating communication devices and the communication device via the network in the video conference; and
set the third sound volume setting in response to detecting the material data,
wherein the audio data of the material data has a higher volume than the first audio data.

16. The one or more non-transitory computer-readable storage media according to claim 10,
wherein the second sound volume setting is determined by decreasing the first sound volume setting by a predetermined value, and
wherein the second sound volume setting is lower than the third sound volume setting.

17. The one or more non-transitory computer-readable storage media according to claim 7, wherein the computer-executable instructions further cause the communication device to:
determine whether the material data is finished streaming; and
change the second sound volume setting back to the first sound volume setting in response to determining that the material data is finished streaming.

18. The one or more non-transitory computer-readable storage media according to claim 7,
wherein the audio output device is one of a plurality of audio output devices;
wherein the communication device is configured to connect to the plurality of audio output devices; and
wherein the material data is outputted through one of the plurality of audio output devices other than the audio output device for outputting the first audio data, and the audio output device for outputting the material data has a third sound volume setting when outputting the material data.

19. The one or more non-transitory computer-readable storage media according to claim 7, wherein the computer-executable instructions further cause the communication device to:
execute a process of sound recognition to the first audio data, in response to determining the acquired material data includes audio data;
generate text data corresponding to inputted first audio data based on a result of executing the process of sound recognition; and
display the generated text data in the display.

20. A method comprising:
receiving at least one of first image data and first audio data from a particular communication device configured to participate in a video conference with the communication device;
transmitting to the particular communication device, at least one of second image data and second audio data;
outputting at least one of the received first image data through a display and the received first audio data through an audio output device having a first sound volume setting, wherein the display is configured to be connected to the communication device and the audio output device is configured to be connected to the communication device;

acquiring material data configured to be shared with the particular communication device, when at least one of the first image data and first audio data is outputted;

determining whether the acquired material data includes audio data;

changing, by a computing device, the first sound volume setting to a second sound volume setting, in response to determining that the acquired material data includes audio data; and outputting the first audio data through the audio output device having the second sound volume setting and the material data according to a third sound volume setting when determining that the material data includes audio data.

* * * * *